US011862082B2

(12) United States Patent
Shinya

(10) Patent No.: US 11,862,082 B2
(45) Date of Patent: Jan. 2, 2024

(54) IMAGE DISPLAY DEVICE AND METHOD OF CONTROLLING IMAGE DISPLAY DEVICE

(71) Applicant: Panasonic Intellectual Property Management Co., Ltd., Osaka (JP)

(72) Inventor: Takeichi Shinya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/765,235

(22) PCT Filed: Oct. 19, 2020

(86) PCT No.: PCT/JP2020/039298
§ 371 (c)(1),
(2) Date: Mar. 30, 2022

(87) PCT Pub. No.: WO2021/085222
PCT Pub. Date: May 6, 2021

(65) Prior Publication Data

US 2022/0351678 A1 Nov. 3, 2022

(30) Foreign Application Priority Data

Oct. 29, 2019 (JP) ................................ 2019-196617

(51) Int. Cl.
*G09G 3/3225* (2016.01)

(52) U.S. Cl.
CPC ....... *G09G 3/3225* (2013.01); *G09G 2300/02* (2013.01); *G09G 2320/0626* (2013.01); *G09G 2360/144* (2013.01)

(58) Field of Classification Search
CPC .... G09G 5/00; G09G 5/10; G09G 2320/0626; G09G 2360/144; G09G 2300/02; H05B 47/00; G09F 9/00
See application file for complete search history.

(56) References Cited

U.S. PATENT DOCUMENTS

2002/0059742 A1* 5/2002 Okazaki .................. G09F 13/28
40/550
2007/0152952 A1* 7/2007 Kang .................. G09G 3/3406
345/102

(Continued)

FOREIGN PATENT DOCUMENTS

JP 2013-156635 A 8/2013
JP 2018-159854 A 1/2018

(Continued)

OTHER PUBLICATIONS

International Search Report dated Dec. 15, 2020 issued in International Patent Application No. PCTJP2020/039298, with English translation.

*Primary Examiner* — Shaheda A Abdin
(74) *Attorney, Agent, or Firm* — McDermott Will & Emery LLP

(57) ABSTRACT

An image display device includes a display panel, a space portion, an illuminator, a controller, and an illuminance sensor. The display panel is switchable between an image display mode in which an image is displayed and a transmissive mode in which the display panel is in a transmissive state where a back side of the display panel is visible in a front view. The space portion and the illuminator are provided behind the display panel. The illuminator emits illumination light to the space portion. The controller controls the illuminator. The illuminance sensor detects an ambient illuminance of the image display device. The controller performs illumination control for causing the illuminator to (Continued)

emit illumination light with a brightness that is in accordance with a result of detection by the illuminance sensor when the display panel is operating in the transmissive mode.

10 Claims, 8 Drawing Sheets

(56) References Cited

U.S. PATENT DOCUMENTS

| | | | | |
|---|---|---|---|---|
| 2008/0007395 | A1* | 1/2008 | Koide | G09G 3/3406 340/501 |
| 2010/0007599 | A1* | 1/2010 | Kerofsky | G09G 3/3611 345/102 |
| 2013/0194167 | A1* | 8/2013 | Yun | G09F 9/35 345/84 |
| 2020/0128976 | A1 | 4/2020 | Ina et al. | |

FOREIGN PATENT DOCUMENTS

| | | | |
|---|---|---|---|
| KR | 10-2013-0034367 | A | 4/2013 |
| WO | 2013/048146 | A1 | 4/2013 |
| WO | 2019/189673 | A1 | 10/2019 |

* cited by examiner

IMAGE DISPLAY DEVICE AND METHOD OF CONTROLLING IMAGE DISPLAY DEVICE

CROSS-REFERENCE OF RELATED APPLICATIONS

This application is the U.S. National Phase under 35 U.S.C. § 371 of International Patent Application No. PCT/JP2020/039298, filed on Oct. 19, 2020, which in turn claims the benefit of Japanese Application No. 2019-196617, filed on Oct. 29, 2019, the entire disclosures of which Applications are incorporated by reference herein.

TECHNICAL FIELD

The present disclosure relates to an image display device which includes a display panel that is operable in a transmissive mode.

BACKGROUND ART

Patent Literature (PTL) 1 discloses a display device which includes a transparent display. The display device includes: a first panel which performs display with use of transparent organic light-emitting diode (OLED) elements; a second panel which is disposed behind the first panel, includes polymer-dispersed liquid crystals, and shields or transmits light from the back; and a controller which switches the second panel between a transparent state and an opaque state. The display device makes the second panel transparent, so that an image of each object behind the first panel and an image on the first panel can be simultaneously viewed. Moreover, it is possible to display a clear image with a high contrast with no intervention of outdoor light from the back of the first panel by making the second panel opaque.

CITATION LIST

Patent Literature

[PTL 1] Japanese Unexamined Patent Application Publication No. 2013-156635

SUMMARY OF INVENTION

Technical Problem

The present disclosure provides an image display device and a method of controlling the image display device each of which is capable of effectively using a display panel that is operable in a transmissive mode.

Solution to Problem

An image display device according to the present disclosure includes: a display panel which is switchable between an image display mode and a transmissive mode, the image display mode being a mode in which an image is displayed on the display panel, the transmissive mode being a mode in which the display panel is in a transmissive state where a back side of the display panel is visible in a front view of the display panel; a space portion which is provided behind the display panel; an illuminator which is disposed behind the display panel, and emits illumination light to the space portion; a controller which controls the illuminator; and an illuminance detector which detects an ambient illuminance of the image display device. When the display panel is operating in the transmissive mode, the controller performs illumination control for causing the illuminator to emit illumination light with a brightness that is in accordance with a result of detection by the illuminance detector.

In a control method of controlling an image display device according to the present disclosure, the image display device includes: a display panel which is switchable between an image display mode and a transmissive mode, the image display mode being a mode in which an image is displayed on the display panel, the transmissive mode being a mode in which the display panel is in a transmissive state where a back side of the display panel is visible in a front view of the display panel; a space portion which is provided behind the display panel; an illuminator which is disposed behind the display panel, and emits illumination light to the space portion; and an illuminance detector which detects an ambient illuminance of the image display device. The control method includes: obtaining a result of detection of the ambient illuminance performed by the illuminance detector; and causing the illuminator to emit illumination light with a brightness that is in accordance with the result of the detection obtained in the obtaining, when the display panel is operating in the transmissive mode.

Advantageous Effects of Invention

Each of an image display device and a method of controlling the image display device according to the present disclosure is capable of effectively using a display panel that is operable in a transmissive mode.

DESCRIPTION OF EMBODIMENT

Figure 1:
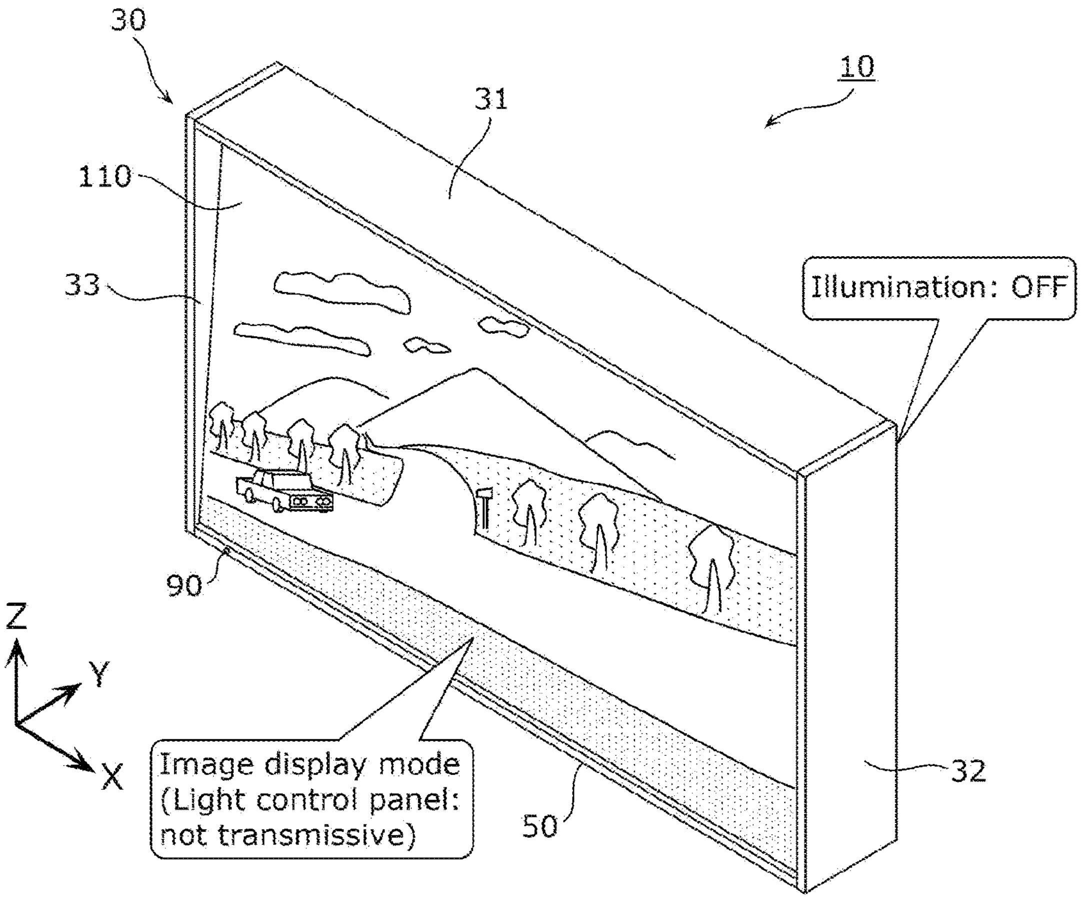
FIG. 1 is an external perspective view of a state of an image display device according to an embodiment when operating in an image display mode (a first display mode).

The inventor of the present application has found the following problem in a conventional image display device. As in a conventional transparent display, a display panel, which is switchable between a state in which an image is displayed and a transmissive state, includes, for example, an organic electro-luminescent (EL) panel including a plurality of organic EL elements disposed on a glass substrate, and a light control sheet which switches between light transmittance and light non-transmittance according to whether or not voltage is applied to polymer-dispersed liquid crystals.

In such a display panel, for example, by not displaying an image on an organic EL panel and turning on the light control sheet (turning the light control sheet into a transmissive state), it is possible to allow a user in front of the display panel to view one or more objects behind the display panel. However, the organic EL panel includes a plurality of organic EL elements arranged in a matrix and the light control sheet includes dispersed liquid crystals. In other words, although the base material of the display panel is a transparent material such as a glass, minute light shielding elements, such as organic EL elements and liquid crystals, are dispersed in the display panel. Accordingly, for the user who views the display panel from the front side, the back side of the display panel may look dark.

In view of the above, the inventor of the present application has studied a configuration in which an illuminator is disposed behind the display panel. With such a configuration, illumination light emitted from the illuminator can be emitted to the objects behind the display panel. This allows the user in front of the display panel to clearly view the objects placed behind the display panel. However, the inventor of the present application has found the following problems caused due to illumination light when the illuminator is disposed behind the display panel. Specifically, when the illuminator is disposed behind the display panel, the brightness around the image display device changes, resulting in insufficient transparency of the display panel or reflection of the illumination light on the display panel (halation).

The present disclosure has been conceived based on such findings. As a result of diligent studies by the inventor of the present application, the inventor has arrived at an idea about a configuration and a control of an image display device capable of effectively using a display panel that operates in a transmissive mode.

Hereinafter, an embodiment will be described with reference to the drawings as necessary. Note that unnecessarily detailed descriptions may be omitted. For example, detailed descriptions of already known matters and overlapping description of substantially the same configuration may be omitted. This is to avoid the following description to become unnecessarily redundant, and to facilitate understanding of the person skilled in the art.

The inventor of the present application provides the accompanying drawings and the following description so that the person skilled in the art fully understands the present disclosure, and do not intend to limit the subject matter of the claims by this.

In the following embodiment, the vertical (top-bottom) direction is represented by a Z-axis, the front-back direction is represented by a Y-axis, and the horizontal (left-right) direction is represented by an X-axis for the sake of description, but these do not limit the orientation of the image display device according to the present disclosure at the time of manufacture or usage. In the following description, for example, a positive X-axis side indicates the direction of the arrow of the X-axis and a negative X-axis side indicates the direction opposite to the positive X-axis. The same applies to the Y-axis and the Z-axis.

Embodiment

Hereinafter, an embodiment of the present disclosure will be described with reference to FIG. 1 to FIG. 9. First, with reference to FIG. 1 to FIG. 5, an outline of a configuration of an image display device according to the present embodiment will be described.

[1-1. Outline of Configuration of Image Display Device]

Figure 2:
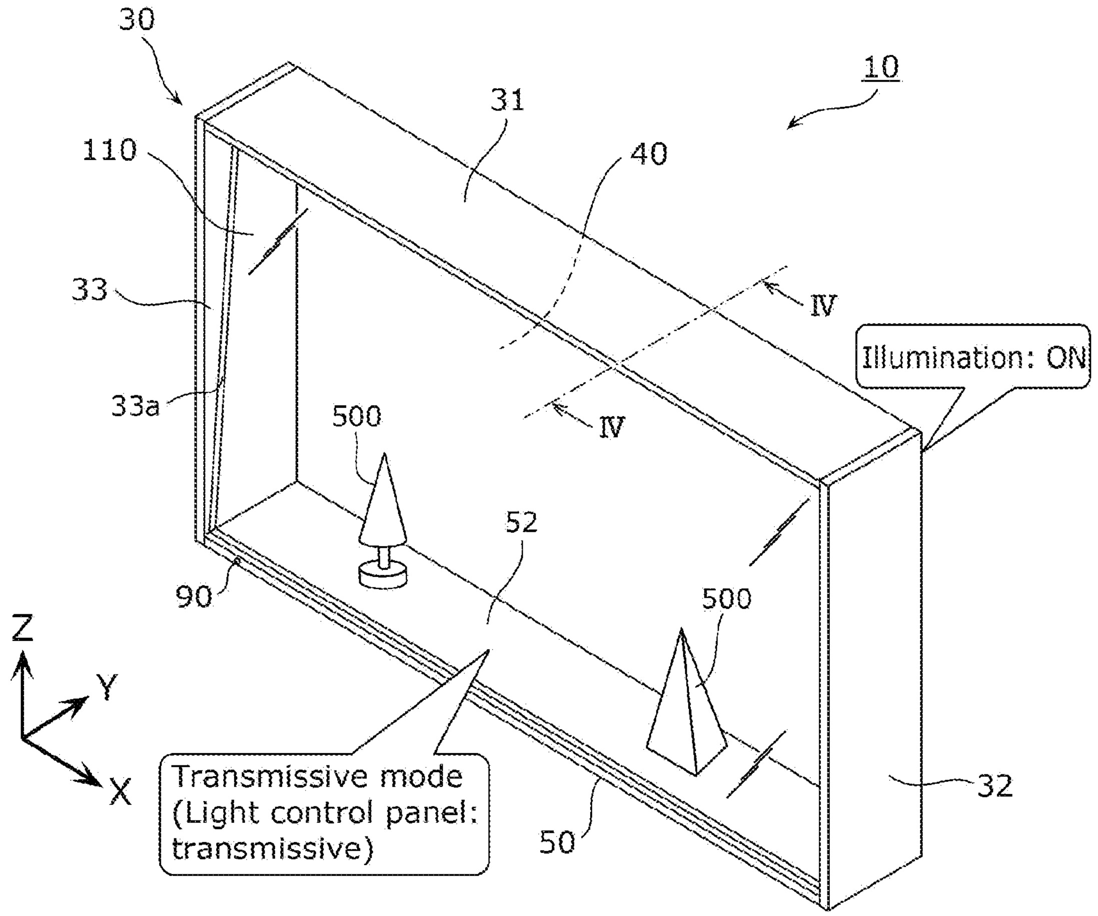
FIG. 2 is an external perspective view of a state of the image display device according to the embodiment when operating in a transmissive mode.
Figure 3:
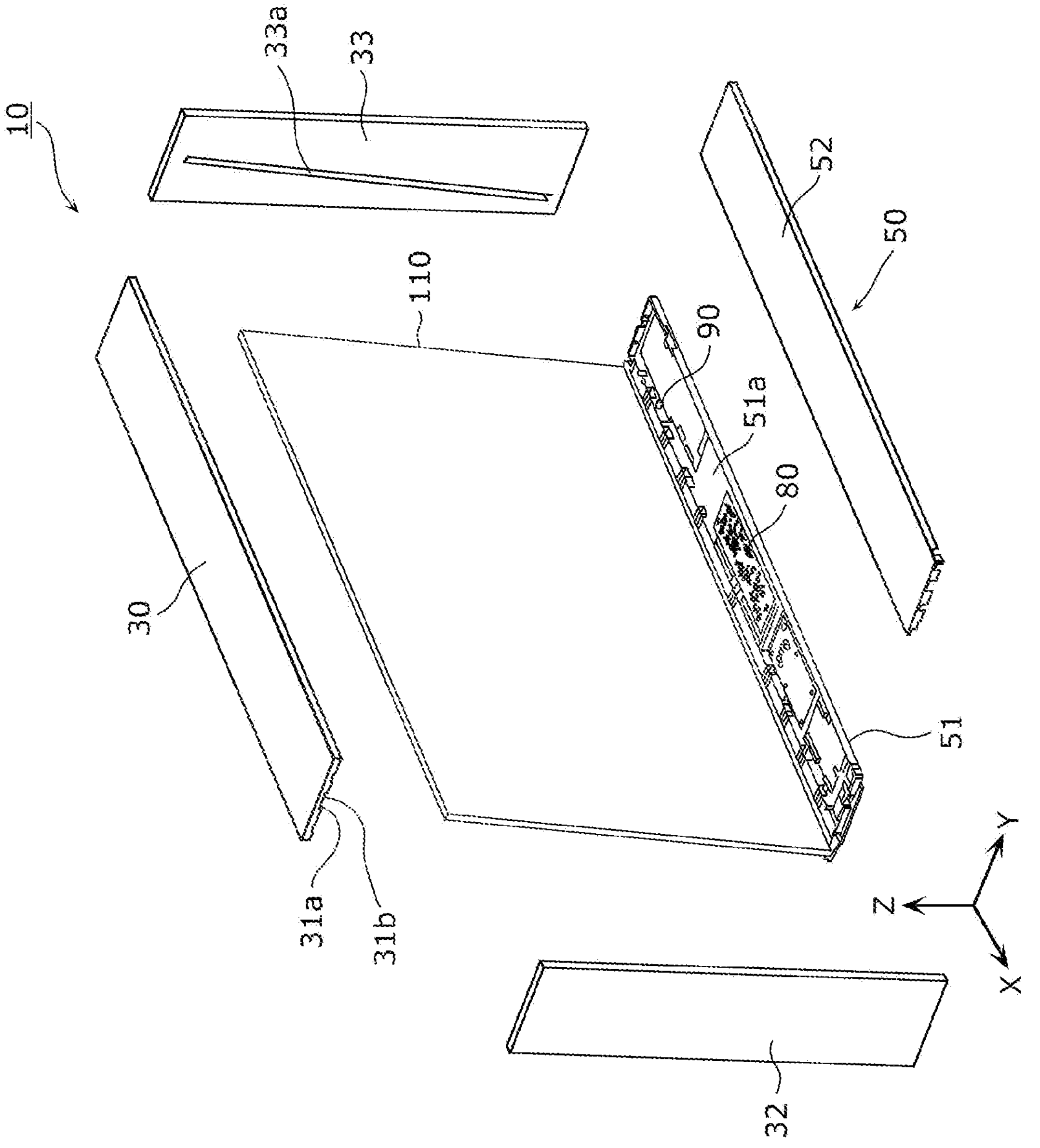
FIG. 3 is an exploded perspective view of an outline of a configuration of the image display device according to the embodiment.
Figure 4:
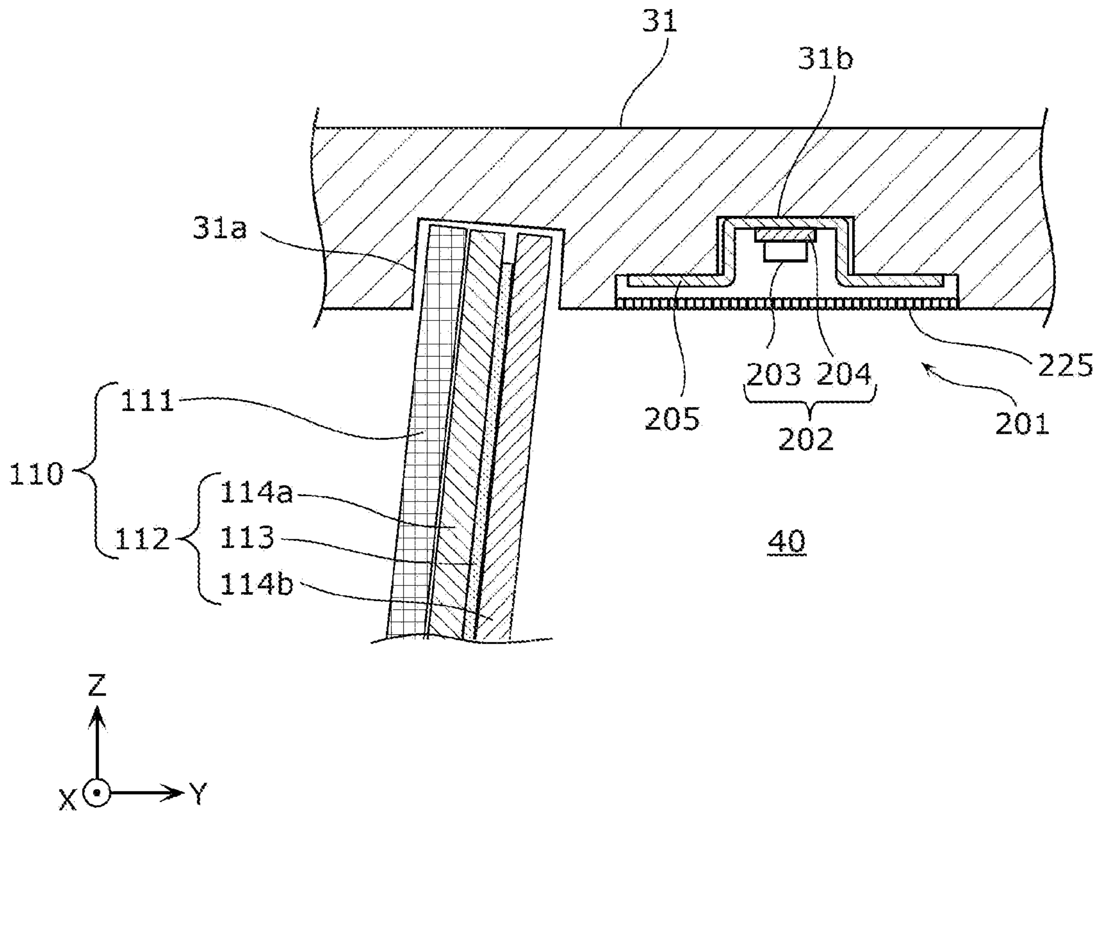
FIG. 4 is a cross-sectional view of an outline of a configuration of a display panel and an illuminator according to the embodiment.
Figure 5:
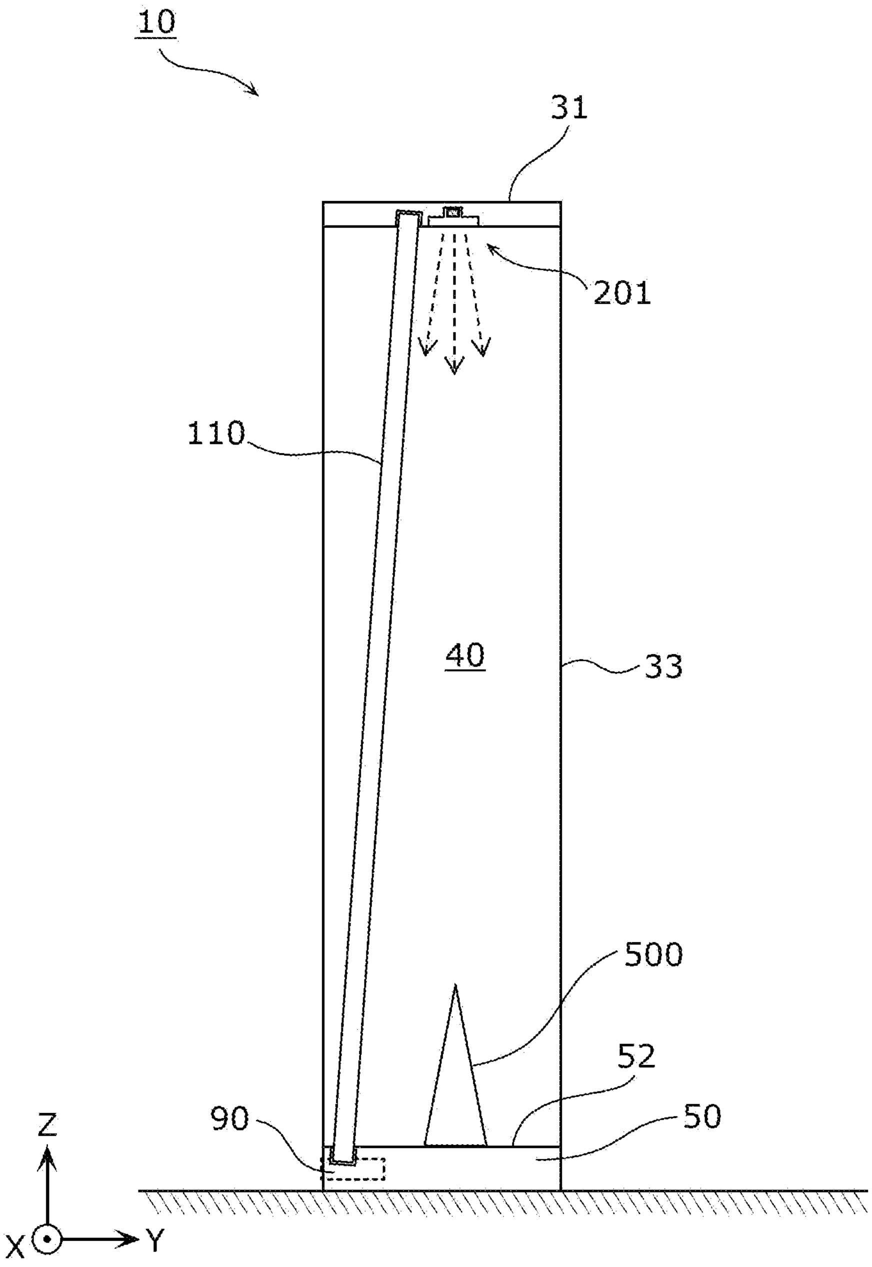
FIG. 5 is a side view of the image display device according to the embodiment.

FIG. 1 is an external perspective view of a state of image display device 10 according to the present embodiment when operating in an image display mode (a first display mode). FIG. 2 is an external perspective view of a state of image display device 10 according to the embodiment when operating in a transmissive mode. FIG. 3 is an exploded perspective view of an outline of a configuration of image display device 10 according to the embodiment. FIG. 4 is a cross-sectional view of an outline of a configuration of display panel 110 and illuminator 201 according to the embodiment. Specifically, FIG. 4 illustrates a portion of a cross-section taken along line IV-IV in FIG. 2. FIG. 5 is a side view of image display device 10 according to the embodiment. In FIG. 5, illustration of right side wall 32 is omitted, and the side surfaces of display panel 110 and illuminator 201 are simply illustrated.

As illustrated in FIG. 1 to FIG. 5, image display device 10 according to the present embodiment includes: display panel 110; shelf board 50; and illuminator 201. In the present embodiment, display panel 110 is surrounded from the outer periphery by frame body 30 which includes shelf board 50, and is supported by frame body 30. In the present embodiment, although image display device 10 may include members other than the members described below, such as a protective panel for protecting the front face of display panel 110, the descriptions and illustrations thereof are omitted.

Display panel 110 is a display device switchable between an image display mode in which an image is displayed on display panel 110 and a transmissive mode in which display panel 110 is in a transmissive state where each of objects behind display panel 110 is visible in the front view of display panel 110. Specifically, as illustrated in FIG. 4, display panel 110 includes organic EL panel 111 and light control panel 112 disposed behind organic EL panel 111. Organic EL panel 111 is an example of an image display panel. Note that the "image" displayed on display panel 110 may be any of a still image or a moving image, or may be video content including both the still image and the moving image.

In the present embodiment, organic EL elements, each of which includes an EL layer and transparent electrodes sandwiching the EL layer, are disposed in a matrix in organic EL panel 111. The region of organic EL panel 111 where an image (including background image) is not displayed has light transmitting properties to the extent generally referred to as transparent. Light control panel 112 includes light control sheet 113, first glass plate **114*a* disposed in front of light control sheet 113, and second glass plate 114*b* disposed behind light control sheet 113. Light control sheet 113 is a member switchable between a light transmissive state and a light non-transmissive state depending on whether or not a predetermined voltage is applied to light control sheet 113. Light control sheet 113 incudes, for example, a liquid crystal layer including liquid crystal molecules having an orientational state changed by presence or absence of an application of voltage, and resin sheets sandwiching the liquid crystal layer. Display panel 110** may include, for example, an optical member, such as an anti-reflection film, in addition to the above described structural elements.

Display panel 110 configured such that organic EL panel 111 and light control panel 112 are layered, is capable of displaying an image on organic EL panel 111, for example, as illustrated in FIG. 1. At this time, by not applying a predetermined voltage to light control sheet 113 (turning off light control sheet 113), light control sheet 113 shields the back side of organic EL panel 111 from light, so that the user is able to view a clear image.

In the present embodiment, the operation mode for displaying an image on organic EL panel 111 is referred to an "image display mode". More specifically, the case where an image is displayed on organic EL panel 111 and light control sheet 113 is turned off is referred to as a "first display mode", and the case where an image is displayed on organic EL panel 111 and a predetermined voltage is applied to light control sheet 113 (light control sheet 113 is turned on) is referred to as a "second display mode". The second display mode will be described later with reference to FIG. 9.

Moreover, as illustrated in FIG. 2, for example, display panel 110 is turned into a transmissive state where objects 500 behind display panel 110 are visible by not displaying an image on organic EL panel 111 and turning on light control sheet 113. In the present embodiment, this operation mode is referred to as a transmissive mode.

Space portion 40 is provided behind display panel 110. In the present embodiment, space portion 40 is a space portion provided behind display panel 110 and within the frame body including a plurality of walls. The walls and the frame body according to the present embodiment will be described below.

Shelf board 50 is disposed behind display panel 110 so as to project rearward. In the present embodiment, shelf board 50 surrounds the periphery of display panel 110 and forms part of frame body 30 which holds display panel 110. Frame body 30 includes shelf board 50, top wall 31, right side wall 32, and left side wall 33. Top wall 31 is disposed along the top side of display panel 110. Right side wall 32 is disposed along the right side of display panel 110 in the front view. Left side wall 33 is disposed along the left side of display panel 110 in the front view. Right side wall 32 is connected to the right end portion of shelf board 50 in the front view, and left side wall 33 is connected to the left end portion of shelf board 50 in the front view. Top wall 31 is connected to the upper end portions of right side wall 32 and left side wall 33. Top wall 31 and shelf board 50 are connected to right side wall 32 and left side wall 33 by, for example, screws.

As illustrated in FIG. 2 and FIG. 3, left side wall 33 has holding groove 33*a* for holding the left edge of display panel 110 in the front view. In a similar manner, right side wall 32 has a holding groove (not illustrated) for holding the right edge of display panel 110 in the front view. As illustrated in FIG. 3 and FIG. 4, top wall 31 has holding groove 31*a* for holding the upper edge of display panel 110.

Each of shelf board 50, top wall 31, right side wall 32, and left side wall 33 includes, for example, a wood pattern sheet pasted onto a metal base material, such as an aluminum or aluminum alloy. In such a case, as illustrated in FIG. 2, when image display device 10 is operating in the transmissive mode, image display device 10 is recognized as furniture or display furniture for displaying objects 500 with the front face covered with a glass. The material of each member of frame body 30 is not limited to metal, but a non-metallic material such as wood or resin may be used as the material of shelf board 50 or the like. In FIG. 4, top wall 31 is illustrated as a solid plate-shaped member, but top wall 31 may be a hollow plate-shaped member.

One or more objects 500 (photo, doll, vase, toy, model, picture and the like) can be placed on placement surface 52 forming the upper face of shelf board 50. The user is able to view objects 500 placed on shelf board 50 through display panel 110 that is operating in the transmissive mode. The transmittance of display panel 110 is, for example, approximately 40% to 50%. Hence, when image display device 10 is placed in a relatively dark environment, the user may fail to clearly view objects 500. In view of the above, image display device 10 includes illuminator 201 which emits illumination light to objects 500 placed in space portion 40 by emitting illumination light to space portion 40.

In image display device 10 configured as described above, the operations of display panel 110 and illuminator 201 are controlled by controller 80 held in shelf board 50. In the present embodiment, as illustrated in FIG. 3, controller 80 is housed inside shelf board 50. Controller 80 is disposed along bottom surface 51*a* of shelf body 51 so that controller 80 falls within the thickness (width in the Z-axis direction) of shelf board 50. Illuminance sensor 90 is further disposed in shelf board 50 as illustrated in FIG. 1 and FIG. 2. Illuminance sensor 90 is fixed to shelf board 50 such that a light receiver is located on the front face of shelf board 50. Illuminance sensor 90 is an example of an illuminance detector, and detects the ambient illuminance of image display device 10, and mainly the illuminance on the front side of image display device 10. The result of detection by illuminance sensor 90 is used for the control (illumination control) of illuminator 201 performed by controller 80. Specific examples of illumination control performed in accordance with the result of detection by illuminance sensor 90 will be described later with reference to FIG. 6 to FIG. 9. In addition to controller 80, devices such as a light receiver that receives an infrared signal transmitted from a remote controller, a speaker unit, a television tuner, input and output terminals for audio and image signals and a wireless communication module may be disposed in shelf body 51.

Illuminator 201 is disposed behind display panel 110 as illustrated in FIG. 3 to FIG. 5. Specifically, as illustrated in FIG. 4, top wall 31 includes illumination groove 31*b* for attaching illuminator 201. Illuminator 201 includes light source unit 202 which emits light and heat sink 205 for dissipating heat generated by light source unit 202. Heat sink 205 also functions as an attachment member for attaching light source unit 202 to illumination groove 31*b*. Heat sink 205 is a metal member such as aluminum or aluminum alloy. Light source unit 202 includes substrate 204 long in the X-axis direction and a plurality of LED elements 203 mounted on substrate 204. LED elements 203 are arranged side by side in the X-axis direction.

Illuminator 201 further includes micro-louver 225 disposed on the light-emitting side of light source unit 202. Micro-louver 225 is an optical member which limits the distribution angle of light emitted from light source unit 202. Micro-louver 225 is a member disposed along light source unit 202 and long in the X-axis direction, and has a configuration in which light shields and light transmitting bodies extended in the X-axis direction are alternately arranged in the short direction (Y-axis direction) of micro-louver 225. In the present embodiment, micro-louver 225 has a role of narrowing the light distribution angle of the illumination light emitted from light source unit 202, which prevents the illumination light from directly entering display panel 110 and the illumination light from leaking to the region behind shelf board 50 (toward the positive Y-axis side).

On and off of illuminator 201 configured as described above is switched according to the operation mode of display panel 110. Specifically, as illustrated in FIG. 1, when display panel 110 operates in the image display mode, controller 80 turns off illuminator 201. Moreover, as illustrated in FIG. 2, when display panel 110 operates in the transmissive mode, controller 80 turns on illuminator 201. As a result, as illustrated in FIG. 2, objects 500 located below illuminator 201 are irradiated with the illumination light, and the user is able to view objects 500 more clearly through display panel 110. Illuminator 201 is embedded in illumination groove 31*b*, and the light distribution angle of illuminator 201 is limited by micro-louver 225. As a result, when display panel 110 is in a transmissive state, the light emitted from illuminator 201 is less likely to directly enter the eyes of the user in front of image display device 10 that is placed on the floor, for example.

However, when the surrounding region of image display device 10 is relatively dark, for example, at night, a state where the illumination light from illuminator 201 is brightly visible on a portion of display panel 110 that is operating in the transmissive mode (so-called reflection of the illumination light) may be observed. In order to reduce such reflection of the illumination light, the brightness of the illumination light may be decreased. However, in such a case, when the surrounding region of image display device 10 is relatively bright, another problem occurs in that the transparency of display panel 110 is diminished due to insufficient brightness of the illumination light.

In view of the above, image display device 10 according to the present embodiment changes the brightness of the illumination light emitted from illuminator 201, according to the ambient brightness. Accordingly, when display panel 110 is in a state where light is transmissive through display panel 110, a natural transparency can be given to display panel 110 regardless of the ambient brightness.

Hereinafter, a configuration related to illumination control included in image display device 10 and a specific example of illumination control performed by image display device 10 will be described with reference to FIG. 6 to FIG. 9.

[1-2. Illumination Control]

Figure 6:
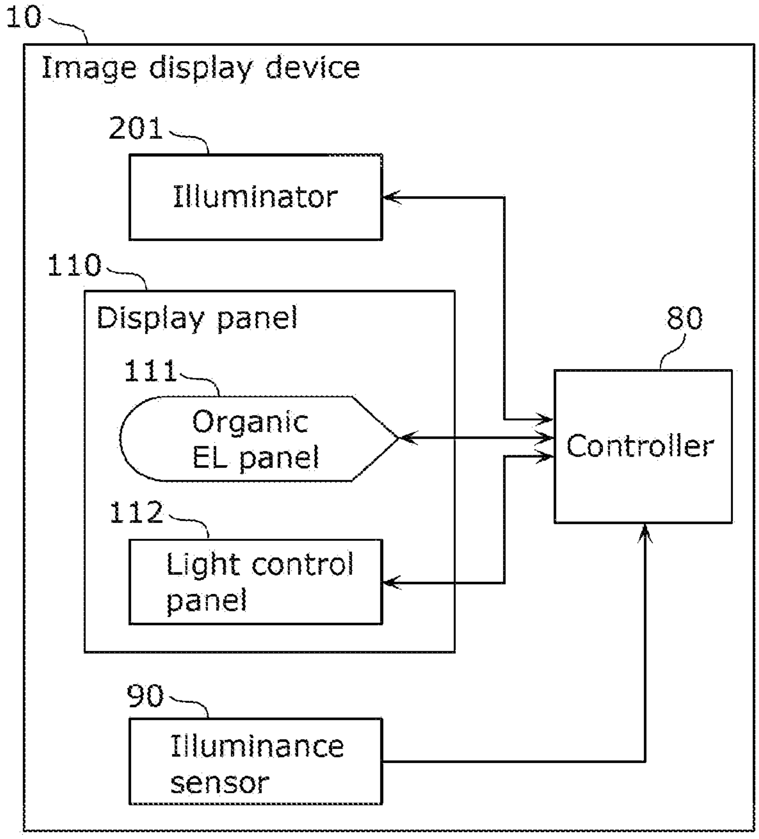
FIG. 6 is a block diagram illustrating a functional configuration of the image display device according to the embodiment.
Figure 7:
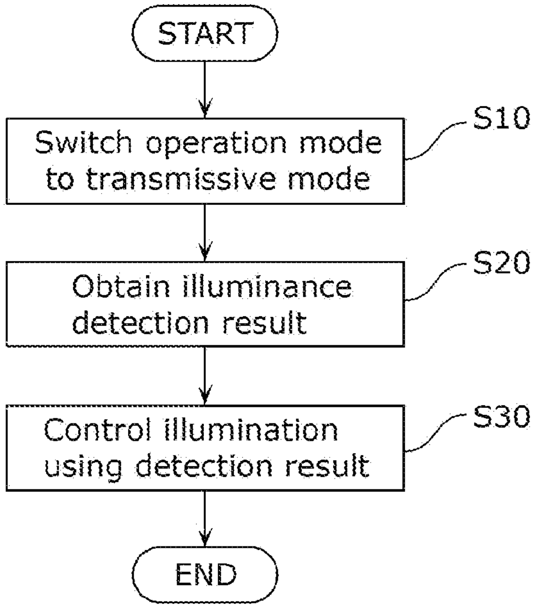
FIG. 7 is a flow diagram of a basic operation of illumination control according to the embodiment.
Figure 8:
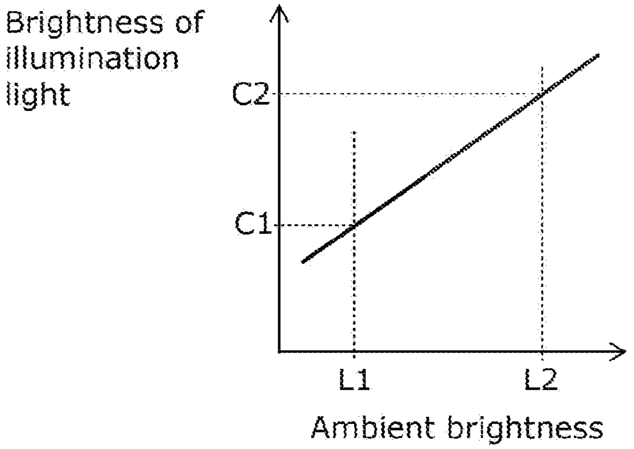
FIG. 8 is a simple diagram illustrating a change in brightness of illumination light emitted from the illuminator included in the image display device according to the embodiment.
Figure 9:
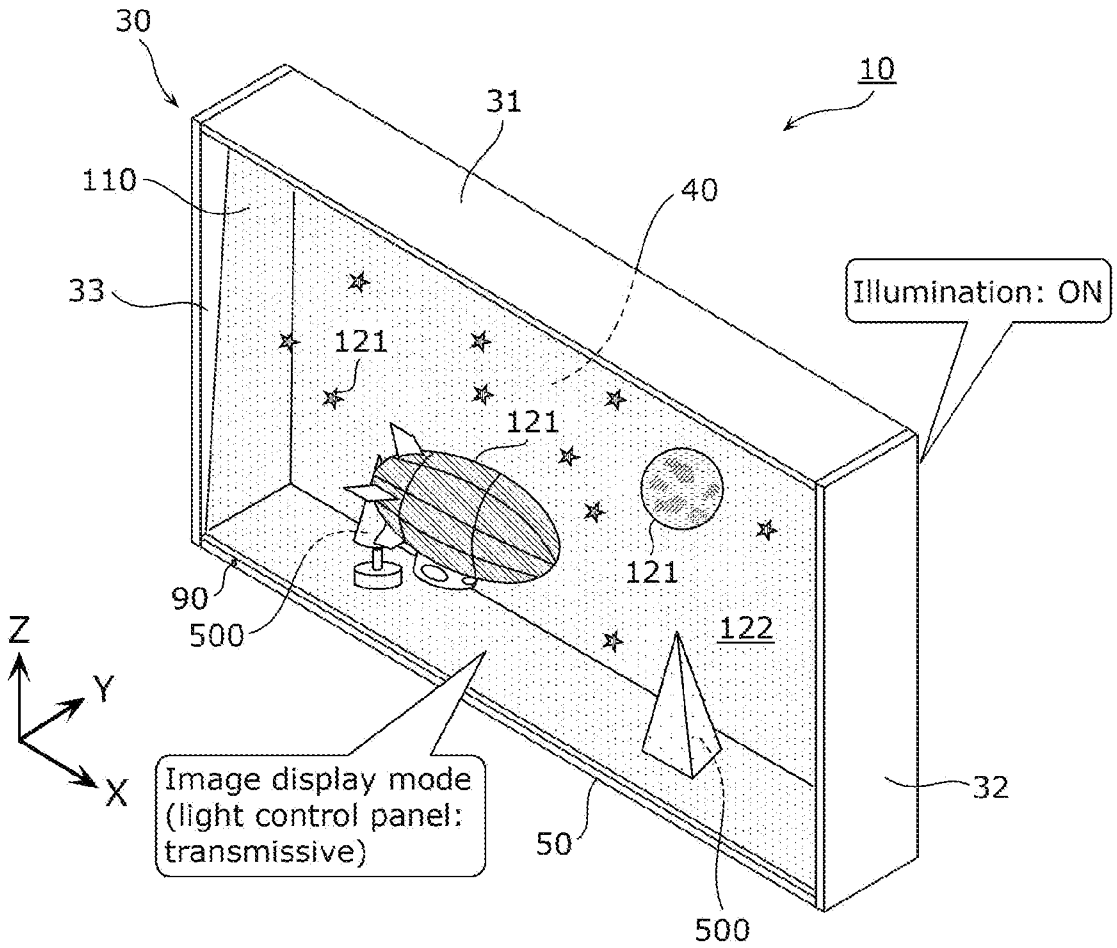
FIG. 9 is an external perspective view of a state of the image display device according to the embodiment when operating in an image display mode (a second display mode).

FIG. 6 is a block diagram illustrating a functional configuration of image display device 10 according to the embodiment. Specifically, FIG. 6 illustrates a functional configuration related to illumination control included in image display device 10. FIG. 7 is a flowchart of a basic operation of the illumination control according to the embodiment. FIG. 8 is a simple diagram illustrating a change in brightness of the illumination light emitted from illuminator 201 of image display device 10 according to the embodiment. FIG. 9 is an external perspective view of a state of image display device 10 according to the embodiment when operating in an image display mode (a second display mode).

As illustrated in FIG. 6, image display device 10 according to the present embodiment includes display panel 110 which includes organic EL panel 111 and light control panel 112, illuminator 201, controller 80, and illuminance sensor 90.

In the present embodiment, controller 80 has a function of controlling the operation of display panel 110 in addition to controlling the operation of illuminator 201 as described above. Controller 80 includes, for example, a computer which includes a central processing unit (CPU), a storage device such as a memory, an interface for inputting and outputting information, and the like. Controller 80 controls illuminator 201 and/or display panel 110 by the CPU executing a predetermined program stored in the storage device, for example, based on an instruction from the user. Controller 80 executes the control illustrated in FIG. 7, for example.

Specifically, for example, controller 80 switches the operation mode of display panel 110 from the image display mode (see FIG. 1) to the transmissive mode (see FIG. 2) based on an instruction from the user (S10). At the time of switching of the operation mode, controller 80 obtains the detection result indicating the ambient brightness detected by illuminance sensor 90 (S20). Controller 80 further controls illuminator 201 using the obtained detection result (S30). In FIG. 7, for the sake of simplicity, switching of the operation mode (S10), obtainment of the detection result (S20), and illumination control (S30) are described in this order, but the flow of control performed by controller 80 is not limited to such an order. Controller 80 is capable of monitoring the ambient brightness of image display device 10 by obtaining the result of the detection by illuminance sensor 90 at predetermined intervals, for example. Moreover, controller 80 is capable of switching illuminator 201 from off to on almost at the same time as switching from the image display mode to the transmissive mode such that the brightness of the light from illuminator 201 is in accordance with the latest detection result at that time.

Specifically, as illustrated in FIG. 8, the light output of illuminator 201 is controlled such that the ambient brightness and the illuminance of the illumination light have a positive correlation. Controller 80 controls the light output of LED elements 203 included in illuminator 201 according to, for example, a pulse width modulation (PWM) signal. The method of controlling the light output is not particularly limited, and the light output of illuminator 201 in image display device 10 may be controlled according to a digital signal.

By controlling the light output of illuminator 201 in such a manner, brightness C1 of the illumination light when the ambient brightness is L1 is less than brightness C2 of the illumination light when the ambient brightness is L2 (L2>L1). L1 is an example of a first illuminance, L2 is an example of a second illuminance, and the unit for each of L1 and L2 is, for example, lux. The unit for each of C1 and C2 is, for example, the dimming rate (%) used for controlling illuminator 201. The dimming rate is a kind of variable for adjusting the brightness of illumination, and is a variable which is capable of increasing the brightness of the illumination with an increase in numerical value (the maximum value is 100%). The dimming rate can also be expressed as, for example, "dimming level" or "dimming ratio". The unit of the ambient brightness and the brightness of the illumination light is an example, and various types of units can be used as long as the unit indicates the level of brightness. For example, the brightness of the illumination light may be expressed in the illuminance (lux) of the illumination light measured at the position of shelf board 50.

In the present embodiment, controller 80 decreases the brightness of the illumination light with a decrease in ambient brightness of image display device 10, that is, with a decrease in illuminance indicated by the result of detection by illuminance sensor 90. In other words, controller 80 increases the brightness of the illumination light with an increase in illuminance indicated by the result of detection by illuminance sensor 90. In other words, the brightness of the illumination light emitted from illuminator 201 decreases monotonically (increases monotonically) with a decrease (an increase) in ambient brightness. In FIG. 8, the ambient brightness and the brightness of the illumination light have a linear relationship, but the ambient brightness and the brightness of the illumination light may have a non-linear relationship.

Moreover, image display device 10 according to the present embodiment is also capable of causing illuminator 201 to emit illumination light when display panel 110 is operating in the image display mode. Specifically, controller 80 displays an image on organic EL panel 111, and also turns on light control sheet 113 of light control panel 112. In such a case, light control panel 112 disposed behind organic EL panel 111 is in a state where light is transmissive through light control panel 111. Accordingly, as illustrated in FIG. 9, the objects placed behind display panel 110 can be easily viewed through the low-brightness portion (dark image portion 122) in the image displayed on organic EL panel 111. In other words, the user is able to view the relatively high-brightness portion (bright image portion 121) in the image, and view the back side through dark image portion 122.

In view of the above, in image display device 10 according to the present embodiment, display panel 110 is operated in the second display mode which is an image display mode in which an image is displayed on organic EL panel 111 and light control panel 112 is in a transmissive state, and illuminator 201 is turned on. As a result, objects 500 placed on shelf board 50 and the image displayed on display panel 110 can be presented to the user at the same time.

The second display mode as described above can be switched from another operation mode according to, for example, an instruction from the user. In such a case, for example, controller 80 may accept an instruction from the user to switch to the second display mode under the condition that the value indicated by the result of detection by illuminance sensor 90 is less than a threshold value. When display panel 110 is operated in the image display mode, controller 80 may operate display panel 110 in the second display mode when the value indicated by the result of detection by illuminance sensor 90 is less than the threshold value. In other words, when display panel 110 is operated in the image display mode, display panel 110 can be automatically switched between the first display mode and the second display mode according to the ambient brightness.

Controller 80 is capable of performing illumination control according to the ambient brightness even when display panel 110 is operating in the second display mode as described above. In other words, when display panel 110 is operating in the second display mode, for example, as illustrated in FIG. 8, controller 80 controls the brightness of the illumination light emitted from illuminator 201 according to the result of detection by illuminance sensor 90. Accordingly, for example, when the surrounding region is dark, illuminator 201 is capable of emitting weak illumination light. As a result, it is possible to reduce a decrease in clarity of bright image portion 121 displayed on display panel 110 and to secure the visibility of objects 500 through a portion (dark image portion 122) of display panel 110.

[2. Advantageous Effects, etc.]

As described above, image display device 10 according to the present embodiment includes display panel 110, space portion 40, illuminator 201, controller 80, and illuminance sensor 90. Display panel 110 is switchable between an image display mode in which an image is displayed and a transmissive mode in which display panel 110 is in a transmissive state where the back side of display panel 110 is visible in the front view of display panel 110. Space portion 40 and illuminator 201 are provided behind display panel 110, and illuminator 201 emits illumination light to space portion 40. Controller 80 controls illuminator 201. Illuminance sensor 90 detects the ambient illuminance of image display device 10. When display panel 110 is operating in the transmissive mode, controller 80 performs illumination control for causing illuminator 201 to emit illumination light with a brightness that is in accordance with the result of the detection by illuminance sensor 90.

With such a configuration, for example, the brightness of the illumination light can be automatically changed between the daytime when the surrounding region is bright due to a large amount of outside light that is entering and the nighttime when the surrounding region is dark due to little influence from the outside light. Accordingly, for example, the brightness of the illumination light on the back side of display panel 110, of which the surrounding is relatively dark and which is operating in the transmissive mode, can be automatically decreased. As a result, the possibility that the reflection of the illumination light (halation) from the back side of display panel 110, which functions like a transparent glass plate, is observed is reduced.

As described above, image display device 10 according to the present embodiment is capable of effectively using display panel 110 that is operable in the transmissive mode.

In the present embodiment, when the detection result indicates a first illuminance (L1) in the illumination control, controller 80 decreases the brightness of the illumination light compared to when the detection result indicates a second illuminance (L2) that is higher than the first illuminance (L1).

With this configuration, for example, when the surrounding region is bright, the brightness of the illumination light at the back side of display panel 110 that is operating in the transmissive mode can be automatically increased, and when the surrounding region is dark, the brightness of the illumination light at the back side of display panel 110 that is operating in the transmissive mode can be automatically decreased. As a result, the user is able to clearly view objects 500 placed on shelf board 50 behind display panel 110 when the surrounding region is bright, and is able to clearly view objects 500 with no reflection of the illumination light when the surrounding region is dark. Since such control of the illumination light is automatically performed, it is possible to provide natural transparency of display panel 110 regardless of the brightness of the surrounding region, without bothering the user. As a result, the visibility of objects 500 placed on shelf board 50 can be maintained or improved.

In the present embodiment, in the illumination control, controller 80 decreases the brightness of the illumination light with a decrease in illuminance indicated by the detection result.

With this configuration, for example, the brightness of the illumination light emitted from illuminator 201 is automatically changed in multiple levels or with no level according to the ambient brightness of image display device 10. Hence, the brightness of the illumination light in the space behind display panel 110 is highly responsive to a change in the ambient brightness. Accordingly, for example, even when the fluctuation range of the ambient brightness is large, the natural transparency of display panel 110 can be maintained while being highly responsive to the change.

In the present embodiment, when display panel 110 operates in the image display mode and light control panel 112 is in the transmissive state, controller 80 further performs illumination control according to the detection result. In other words, even when display panel 110 is operating in the second display mode, controller 80 is capable of performing illumination control according to the ambient brightness.

With this configuration, when an image is displayed on display panel 110, dark image portion 122 which has a low brightness in the image is the portion through which the back side of display panel 110 is visible from the front when the back side of display panel 110 is relatively bright. In other words, the user is able to view objects 500 placed on shelf board 50 through dark image portion 122 on display panel 110. Accordingly, when such dark image portion 122 is included in the image, the illumination control performed according to the ambient brightness allows objects 500 that are viewed through dark image portion 122 to be appropriately illuminated, and reduces the reflection of the illumination light on display panel 110.

Here, in the present embodiment, controller 80 is capable of performing illumination control according to the ambient brightness in both when display panel 110 is operating in the transmissive mode (see FIG. 2) and when display panel 110 is operating in the second display mode (see FIG. 9). In this case, when the detection result indicates a predetermined illuminance in the illumination control, controller 80 may change the brightness of the illumination light according to whether display panel 110 is operating in the image display mode (more specifically, the second display mode) or the transmissive mode.

With this configuration, the brightness of the illumination light can be changed between the second display mode and the transmissive mode even when the ambient brightness is the same (a predetermined illuminance). Accordingly, more adaptive illumination control can be performed in such a manner that, for example, the brightness of the illumination light is relatively decreased in the second display mode so that the illumination light does not affect the display image much at all, and the brightness of the illumination light is relatively increased in the transmissive mode so that the user is able to more clearly view objects 500.

Focusing on the structural features of image display device 10, in image display device 10, space portion 40 is provided within the four walls that surround display panel 110 from the top, bottom, left, and right in the front view. Illuminator 201 is disposed in at least one of the four walls, at a position behind display panel 110. Specifically, in the present embodiment, image display device 10 includes frame body 30 that surrounds the periphery of display panel 110 in the front view, and frame body 30 includes four walls which are top wall 31, right side wall 32, left side wall 33, and shelf board 50. In other words, space portion 40 is provided inside frame body 30, at a position behind display panel 110.

As described above, in the present embodiment, illuminator 201 is disposed at a position in one of the four walls that forms the outer silhouette of image display device 10. Hence, for example, even when image display device 10 is moved, it is not necessary to adjust the position or orientation of illuminator 201. Moreover, for example, the wall in which illuminator 201 is disposed can be used as a heat dissipating member of illuminator 201. In the present embodiment, as illustrated in FIG. 4 and FIG. 5, illuminator 201 is arranged in top wall 31, at a position behind display panel 110, and illuminator 201 emits illumination light toward space portion 40 that is below illuminator 201. In this case, it is unlikely that the illumination light emitted from illuminator 201 directly enters the eyes of the user in front of image display device 10 placed on the floor, for example. Since the base material of top wall 31 is made of a metal such as an aluminum alloy, the heat generated by LED elements 203 included in illuminator 201 can be efficiently dissipated. This reduces the degradation of LED elements 203.

The arrangement position of illuminator 201 is not limited to top wall 31, and may be right side wall 32, left side wall 33, or shelf board 50. In this case, the illumination light can be emitted from the right side, the left side, or the lower side of objects 500, which creates a unique shadow on each object 500. Illuminator 201 may be arranged in each of the four walls of frame body 30. In other words, the number and arrangement positions of illuminators 201 may be appropriately determined according to the size, application or the like of image display device 10.

In the present embodiment, it can be expressed that illuminator 201 is disposed in an orientation which causes illuminator 201 to emit illumination light to any one of the above four walls. In other words, part of frame body 30 that has functions of protecting and supporting display panel 110 can be used as a place for placing objects 500 to be illuminated with illumination light. Accordingly, objects 500 can be exhibited or the like without separately using a plate-shaped member for placing objects 500.

The method of controlling image display device 10 according to the present embodiment will be described, for example, as below. Image display device 10 includes display panel 110, space portion 40, and illuminator 201 described above. The method of controlling image display device 10 includes: obtaining (S20 in FIG. 7) a result of detection of illuminance by illuminance sensor 90, and when display panel 110 is operating in the transmissive mode, causing illuminator 201 (S30 in FIG. 7) to emit illumination light with a brightness that is in accordance with the detection result obtained in the obtaining.

With this control method, as described above, for example, the brightness of the illumination light on the back side of display panel 110, of which the surrounding is relatively dark and which is operating in the transmissive mode, can be automatically decreased. As a result, the possibility that the reflection of the illumination light (halation) from the back side of display panel 110, which functions like a transparent glass plate, is observed is reduced. As described above, the method of controlling image display device 10 according to the present embodiment is capable of effectively using display panel 110 that is operable in the transmissive mode.

Other Embodiments

As described above, the embodiment has been described as an example of the technique disclosed in the present application. However, the technique according to the present disclosure is not limited to such an example, and is applicable to embodiments to which various kinds of modifications, replacements, additions, deletions and the like have appropriately been made. Moreover, each structural element described in the above embodiment may be combined to obtain a new embodiment. Another embodiment will be described below as an example.

For example, display panel 110 according to an embodiment may include a different type of display device from organic EL panel 111, as a display device for displaying an image. Specifically, instead of organic EL panel 111, an inorganic EL panel which is a self-emitting display device like organic EL panel 111 may be included in display panel 110.

The second display mode may be treated as one type of "transmissive mode" because it is an operation mode in which light control panel 112 included in display panel 110 is in a transmissive state. For example, the operation mode of image display device 10 illustrated in FIG. 2 may be a "first transmissive mode", and the operation mode of image display device 10 illustrated in FIG. 9 may be a "second transmissive mode".

Shelf board 50 does not always have to be part of frame body 30. For example, shelf board 50 may be disposed at a given position in the vertical direction of frame body 30 including four walls which are the top wall, the bottom wall, the left side wall, and the right side wall, such that shelf board 50 is laid between the left side wall and the right side wall. In such a case, an illuminator may be disposed on the lower surface of shelf board 50 such that illumination light is emitted to the objects placed on the wall below shelf board 50. In other words, by providing shelf board 50 on frame body 30, two tiers of top and bottom shelfs for placing objects may be provided.

The optical member of illuminator 201 that limits the light distribution angle of light source unit 202 may be an optical member of a type different from that of the micro-louver (for example, a lens or a reflector).

It has been described that light control sheet 113 according to the embodiment is switchable from the non-transmissive state to the transmissive state by an application of a predetermined voltage (by turning on light control sheet 113). However, light control sheet 113 may be switched from the transmissive state to the non-transmissive state by an application of a predetermined voltage. In this case, for example, even when the main power of image display device 10 is off, light control sheet 113 is maintained in the transmissive state. Accordingly, even when the main power of image display device 10 is off, it is possible to allow the user in front of display panel 110 to view, through display panel 110, objects 500 placed behind display panel 110. In this case, in order to illuminate objects 500, image display device 10 may include an electric circuit which is capable of turning on illuminator 201 (causing illuminator 201 to illuminate) even when the main power of image display device 10 is off.

Controller 80 may be separate controllers which are an illumination controller which controls illuminator 201 and a display controller which controls display panel 110. In other words, the controller which controls illuminator 201 does not have to include a function of controlling display panel 110.

In the embodiment, it has been described that controller 80 is housed in shelf board 50, however, the member in which controller 80 is disposed is not limited to shelf board 50, but, for example, may be top wall 31, right side wall 32, or left side wall 33. Moreover, controller 80 may be disposed outside frame body 30. For example, in order to reduce the thickness of shelf board 50, electric devices such as controller 80 may be housed in a housing different from frame body 30.

Image display device 10 may include, below shelf board 50, a stand or the like for placing image display device 10. The placement of image display device 10 is not particularly limited. For example, image display device 10 may be attached to the wall surface by, for example, a wall hanging unit.

Display panel 110 may be arranged in one section of a rack having a plurality of sections arranged in the vertical and/or lateral direction where objects 500 can be placed. Accordingly, it is possible to configure an image display device (or a rack) such that exhibition of objects 500 and display of an image can be performed in at least one section, and objects 500 can be exhibited or housed by using another one or more sections.

Objects 500 do not always have to be placed on shelf board 50. Shelf board 50 may function only as a portion of the building frame of image display device 10.

Image display device 10 does not have to include shelf board 50 for placing objects 500. In such a case, too, the placement surface on which image display device 10 is placed is used as a placement surface for placing objects 500, so that the user in front of display panel 110 is able to view objects 500 placed behind display panel 110 operating in the transmissive mode. In other words, space portion 40 is provided in the region surrounded by top wall 31, right side wall 32, left side wall 33, and the placement surface, and objects 500 can be placed in space portion 40. In addition, illumination light can be emitted from illuminator 201 to objects 500. In image display device 10, the periphery of display panel 110 does not have to be surrounded by four walls. Image display device 10 may include, for example, a rectangular frame that surrounds the periphery of display panel 110 instead of frame body 30. Even in such a case, for example, the illuminator may be disposed on the upper portion of the frame, at a position behind display panel 110, such that illumination light can be emitted to space portion 40 behind display panel 110. In this case, space portion 40 may be defined, for example, as a space behind display panel 110, a space in a range covered by display panel 110 in the front view, and a space in a range where the illumination light emitted from the illuminator reaches.

As described above, the embodiment has been described as an example of the technique disclosed in the present disclosure. For this purpose, the accompanying drawings and detailed description have been provided.

Accordingly, the structural elements described in the accompanying drawings and detailed description may include not only structural elements which are essential for solving the problem but also structural elements which are not essential for solving the problem but are provided for illustrating the technique. Therefore, the non-essential structural elements described in the attached drawings and/or the detailed description should not be instantly acknowledged to be essential structural elements.

Since the above embodiment is intended to illustrate the technique in the present disclosure, it is possible to make various kinds of modifications, replacements, additions, deletions, and the like within the scope of the claims or an equivalent scope thereof.

INDUSTRIAL APPLICABILITY

The present disclosure is applicable to an image display device, such as a television receiver, a monitor display, or a digital signage.

The invention claimed is:

1. An image display device comprising:

a display panel which is switchable between an image display mode and a transmissive mode, the image display mode being a mode in which an image is displayed on the display panel, the transmissive mode being a mode in which the display panel is in a transmissive state where a back side of the display panel is visible in a front view of the display panel;

a space portion which is provided behind the display panel;

an illuminator which is disposed outside of and behind the display panel, and emits illumination light to the space portion;

a controller which controls the illuminator;

an illuminance detector which detects an ambient illuminance of the image display device; and a frame body that holds the display panel, forms the space portion and includes four walls which surround the display panel from top, bottom, left, and right in the front view, wherein:

when the display panel is operating in the transmissive mode, the controller performs illumination control for causing the illuminator to emit illumination light with a brightness that is in accordance with a result of detection by the illuminance detector, the display panel includes:

an image display panel which displays an image when the display panel is operating in the image display mode; and a light control panel which is disposed behind the image display panel, and is switchable between a transmissive state and a non-transmissive state, the transmissive state being a state where light is transmissive through the light control panel, the non-transmissive state being a state where light is not transmissive through the light control panel, the controller further performs the illumination control according to the result of the detection, when the display panel operates in the image display mode and the light control panel is in the transmissive state, and the illuminator is disposed in at least one of the four walls, at a position behind the display panel to emit the illumination light to the space portion.

2. The image display device according to claim 1, wherein, in the illumination control, when the result of the detection indicates a first illuminance, the controller decreases a brightness of the illumination light compared to when the result of the detection indicates a second illuminance that is higher than the first illuminance.

3. The image display device according to claim 1, wherein, in the illumination control, the controller decreases a brightness of the illumination light with a decrease in an illuminance indicated by the result of the detection.

4. The image display device according to claim 1, wherein, in the illumination control, when the result of the detection indicates a predetermined illuminance, the controller changes the brightness of the illumination light according to whether the display panel is operating in the image display mode or in the transmissive mode.

5. The image display device according to claim 1, wherein the illuminator is disposed in an orientation that causes the illuminator to emit the illumination light to at least one of the four walls.

6. The image display device according to claim 1, wherein the illuminator is disposed at a top wall of the four walls which is disposed at the top in the front view.

7. The image display device according to claim 1, wherein, when the display panel is operating in the transmissive mode, one or more objects behind the display panel and arranged on a bottom wall of the four walls which is disposed at the bottom in the front view are observable through the display panel.

8. The image display device according to claim 1, wherein the controller switches the image display mode and the transmissive mode in accordance with the result of detection by the illuminance detector.

9. A control method of controlling an image display device which includes:

a display panel which is switchable between an image display mode and a transmissive mode, the image display mode being a mode in which an image is displayed on the display panel, the transmissive mode being a mode in which the display panel is in a transmissive state where a back side of the display panel is visible in a front view of the display panel;

a space portion which is provided behind the display panel;

an illuminator which is disposed outside of and behind the display panel, and emits illumination light to the space portion;

an illuminance detector which detects an ambient illuminance of the image display device; and a frame body that holds the display panel, forms the space portion and includes four walls which surround the display panel from top, bottom, left, and right in the front view, the illuminator being disposed in at least one of the four walls, at a position behind the display panel to emit the illumination light to the space portion, the control method comprising:

obtaining a result of detection of the ambient illuminance performed by the illuminance sensor; and causing the illuminator to emit illumination light with a brightness that is in accordance with the result of the detection obtained in the obtaining, when the display panel is operating in the transmissive mode, wherein:

the display panel includes:

an image display panel which displays an image when the display panel is operating in the image display mode; and a light control panel which is disposed behind the image display panel, and is switchable between a transmissive state and a non-transmissive state, the transmissive state being a state where light is transmissive through the light control panel, the non-transmissive state being a state where light is not transmissive through the light control panel, and the control method comprises performing the illumination control according to the result of the detection, when the display panel operates in the image display mode and the light control panel is in the transmissive state.

10. An image display device comprising:

a display panel which is switchable between an image display mode and a transmissive mode, the image display mode being a mode in which an image is displayed on the display panel, the transmissive mode being a mode in which the display panel is in a transmissive state where a back side of the display panel is visible in a front view of the display panel;

a frame body including a top wall, side walls, and a bottom wall and forming a space portion which is provided behind the display panel;

one or more objects arranged on the bottom wall;

an illuminator which is disposed outside of and behind the display panel, and emits illumination light to the space portion;

a controller which controls the illuminator; and an illuminance detector which detects an ambient illuminance of the image display device, wherein, when the display panel is operating in the transmissive mode, the controller performs illumination control for causing the illuminator to emit illumination light with a brightness that is in accordance with a result of detection by the illuminance detector, and the one or more objects are observable through the display panel; and wherein:

the display panel includes:

an image display panel which displays an image when the display panel is operating in the image display mode; and a light control panel which is disposed behind the image display panel, and is switchable between a transmissive state and a non-transmissive state, the transmissive state being a state where light is transmissive through the light control panel, the non-transmissive state being a state where light is not transmissive through the light control panel, the controller further performs the illumination control according to the result of the detection, when the display panel operates in the image display mode and the light control panel is in the transmissive state, and the illuminator is disposed in at least one of the top, side and bottom walls, at a position behind the display panel to emit the illumination light to the space portion.

* * * * *